United States Patent
Naqvi et al.

(10) Patent No.: US 8,827,865 B2
(45) Date of Patent: Sep. 9, 2014

(54) CONTROL SYSTEM FOR A HYBRID POWERTRAIN SYSTEM

(75) Inventors: Ali K. Naqvi, White Lake, MI (US); Besim Demirovic, Troy, MI (US); Pinaki Gupta, Wixom, MI (US); Lawrence A. Kaminsky, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 368 days.

(21) Appl. No.: 13/223,052

(22) Filed: Aug. 31, 2011

(65) Prior Publication Data

US 2013/0053212 A1    Feb. 28, 2013

(51) Int. Cl.
| | |
|---|---|
| *B60W 10/02* | (2006.01) |
| *B60K 6/365* | (2007.10) |
| *B60W 20/00* | (2006.01) |
| *B60K 6/445* | (2007.10) |
| *B60W 30/19* | (2012.01) |

(52) U.S. Cl.
CPC ............... *B60K 6/365* (2013.01); *B60W 20/00* (2013.01); *B60K 6/445* (2013.01); *B60W 10/02* (2013.01); *B60W 30/19* (2013.01)
USPC .......................................................... 477/5

(58) Field of Classification Search
USPC .......................................................... 477/5
See application file for complete search history.

(56) References Cited

U.S. PATENT DOCUMENTS

| | | | |
|---|---|---|---|
| 6,832,148 | B1 | 12/2004 | Bennett |
| 6,868,318 | B1 | 3/2005 | Cawthorne |
| 7,154,236 | B1 | 12/2006 | Heap |
| 7,416,511 | B2 * | 8/2008 | Nishina et al. ..................... 477/5 |
| 2005/0076958 | A1 | 4/2005 | Foster |
| 2005/0077867 | A1 | 4/2005 | Cawthorne |
| 2005/0077877 | A1 | 4/2005 | Cawthorne |
| 2005/0080523 | A1 | 4/2005 | Bennett |
| 2005/0080527 | A1 | 4/2005 | Tao |
| 2005/0080535 | A1 | 4/2005 | Steinmetz |
| 2005/0080537 | A1 | 4/2005 | Cawthorne |
| 2005/0080538 | A1 | 4/2005 | Hubbard |
| 2005/0080539 | A1 | 4/2005 | Hubbard |
| 2005/0080540 | A1 | 4/2005 | Steinmetz |
| 2005/0080541 | A1 | 4/2005 | Sah |
| 2005/0182526 | A1 | 8/2005 | Hubbard |
| 2005/0182543 | A1 | 8/2005 | Sah |
| 2005/0182546 | A1 | 8/2005 | Hsieh |
| 2005/0182547 | A1 | 8/2005 | Sah |
| 2005/0189918 | A1 | 9/2005 | Weisgerber |
| 2005/0252283 | A1 | 11/2005 | Heap |
| 2005/0252305 | A1 | 11/2005 | Hubbard |
| 2005/0252474 | A1 | 11/2005 | Sah |
| 2005/0255963 | A1 | 11/2005 | Hsieh |

(Continued)

*Primary Examiner* — Justin Holmes
*Assistant Examiner* — Stacey Fluhart

(57) ABSTRACT

A vehicle includes a powertrain with an engine, first and second torque machines, and a hybrid transmission. A method for operating the vehicle includes operating the engine in an unfueled state, releasing an off-going clutch which when engaged effects operation of the hybrid transmission in a first continuously variable mode, and applying a friction braking torque to a wheel of the vehicle to compensate for an increase in an output torque of the hybrid transmission resulting from releasing the off-going clutch. Subsequent to releasing the off-going clutch, an oncoming clutch which when engaged effects operation of the hybrid transmission in a second continuously variable mode is synchronized. Subsequent to synchronization of the oncoming clutch, the oncoming clutch is engaged.

11 Claims, 4 Drawing Sheets

(56) References Cited

U.S. PATENT DOCUMENTS

| | | |
|---|---|---|
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2008/0312029 A1* | 12/2008 | Matsubara et al. ............... 477/3 |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1* | 5/2009 | Heap et al. ............... 477/5 |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |

(56) References Cited

U.S. PATENT DOCUMENTS

| | | |
|---|---|---|
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |
| 2010/0298089 A1* | 11/2010 | Sah .................................. 477/5 |
| 2010/0298090 A1* | 11/2010 | Sah .................................. 477/5 |
| 2011/0083639 A1* | 4/2011 | Gallon et al. ................. 123/321 |

\* cited by examiner

CONTROL SYSTEM FOR A HYBRID POWERTRAIN SYSTEM

GOVERNMENT CONTRACT RIGHTS

This invention was made with U.S. Government support under Agreement No. DE-FC26-08NT04386, awarded by the U.S. Department of Energy The U.S. Government may have certain rights in this invention.

TECHNICAL FIELD

This disclosure is related to control systems for hybrid powertrain systems.

BACKGROUND

The statements in this section merely provide background information related to the present disclosure and may not constitute prior art.

Known hybrid powertrain architectures employ internal combustion engines and non-combustion torque machines, e.g., electric machines to generate torque that is transferred through a transmission device to an output member. One hybrid powertrain includes a two-mode, compound-split, electro-mechanical transmission that is coupled to a driveline of a motor vehicle for transmitting tractive torque thereto. The torque machines may operate as motors or generators to generate torque that is transferred to the transmission independently of torque from the internal combustion engine. The torque machines may transform vehicle kinetic energy transmitted through the vehicle driveline to energy that is storable in an energy storage device. A control system monitors various inputs from the vehicle and the operator and provides operational control of various elements of the hybrid powertrain, including controlling transmission operating state and gear shifting, controlling the engine and the torque machines, and regulating the power interchange between the energy storage device and the torque machines to manage outputs of the transmission, including torque and rotational speed.

SUMMARY

A vehicle includes a powertrain with an engine, first and second torque machines, and a hybrid transmission. A method for operating the vehicle includes operating the engine in an unfueled state, releasing an off-going clutch which when engaged effects operation of the hybrid transmission in a first continuously variable mode, and applying a friction braking torque to a wheel of the vehicle to compensate for an increase in an output torque of the hybrid transmission resulting from releasing the off-going clutch. Subsequent to releasing the off-going clutch, an oncoming clutch which when engaged effects operation of the hybrid transmission in a second continuously variable mode is synchronized. Subsequent to synchronization of the oncoming clutch, the oncoming clutch is engaged.

BRIEF DESCRIPTION OF THE DRAWINGS

One or more embodiments will now be described, by way of example, with reference to the accompanying drawings, in which.

DETAILED DESCRIPTION

Figure 1:
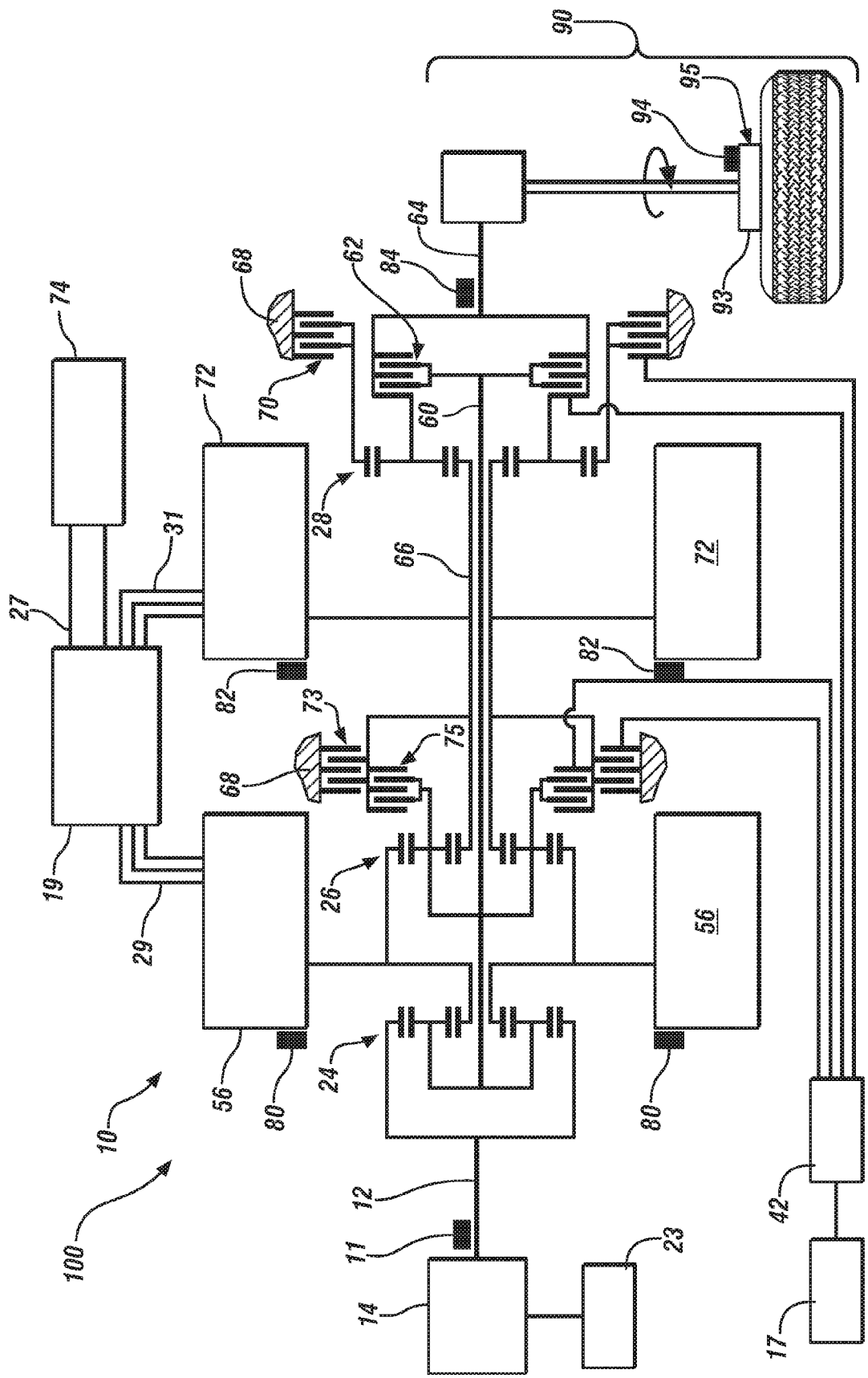
FIG. 1 illustrates a hybrid powertrain configured to operate in at least two continuously variable operating modes in accordance with the present disclosure.

Referring now to the drawings, wherein the showings are for the purpose of illustrating certain exemplary embodiments only and not for the purpose of limiting the same, FIG. 1 depicts an electro-mechanical hybrid powertrain 100. The electro-mechanical hybrid powertrain 100 includes a two-mode, compound-split, electro-mechanical hybrid transmission 10 including first and second electric machines 56 and 72, respectively, and an internal combustion engine 14. The illustrated electro-mechanical hybrid powertrain 100 is a non-limiting embodiment of a hybrid powertrain system that is configured to operate in at least two continuously variable operating modes.

The engine 14 and the first and second electric machines 56 and 72 each generate power in the form of torque which is transferred to the transmission 10. Power transfer from the engine 14 and the first and second electric machines 56 and 72 is described in terms of input torque, motor A torque, and motor B torque, respectively, and input speed, motor A speed, and motor B speed, respectively. Generated torque may be in the form of tractive torque or reactive torque. Tractive torque is positive torque that is generated to accelerate an output member 64 of the transmission 10, and hence accelerate a vehicle. Reactive torque is negative torque that is generated to decelerate the output member 64 of the transmission 10, and hence decelerate the vehicle.

The engine 14 preferably includes a multi-cylinder internal combustion engine selectively operative in several states to transfer torque to the transmission 10 via an input member 12, and may be either a spark-ignition or a compression-ignition engine. The engine 14 includes a crankshaft coupled to the input member 12 of the transmission 10. A rotational speed sensor 11 monitors rotational speed of the input member 12. Power output from the engine 14, including rotational speed and engine torque, may differ from the input speed and the input torque to the transmission 10 due to placement of torque-consuming components on the input member 12 between the engine 14 and the transmission 10, e.g., a hydraulic pump and/or a torque management device.

The transmission 10 in one embodiment includes three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (TCM) 17, is operative to control clutch states. Clutches C2 62 and C4 75 preferably include hydraulically-applied rotating friction clutches. Clutches C1 70 and C3 73 preferably include hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably include three-phase AC machines, each including a stator and a rotor, and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably includes a variable reluctance device including a resolver stator and a resolver rotor. The resolvers 80 and 82 are appropriately positioned and assembled on respective ones of the first and second electric machines 56 and 72. Each of the resolvers 80 and 82 senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72.

The transmission 10 includes the output member 64, e.g. a shaft that is coupled to a driveline 90 for a vehicle to provide output power that is transferred to vehicle wheels 93, one of which is shown in FIG. 1. The output power at the output member 64 is characterized in terms of an output rotational speed and an output torque. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of the distributed controller system described with reference to FIG. 2 to determine vehicle speed, and absolute and relative wheel speeds for braking control, traction control, and vehicle acceleration management. Each of the vehicle wheels 93 is equipped with a friction brake 95 for applying friction braking torque.

The input torque, motor A torque, and motor B torque are generated as a result of energy conversion from fuel or electrical potential stored in an electrical energy storage device (ESD) 74. The ESD 74 is high voltage DC-coupled to an inverter module (TPIM) 19 via DC transfer conductors 27. The TPIM 19 employs transfer conductors 29 to transfer electrical power to and from the first electric machine 56, and the TPIM 19 similarly employs transfer conductors 31 to transfer electrical power to and from the second electric machine 72 in response to commands for the motor A torque and the motor B torque. Electrical current is transmitted to and from the ESD 74 in accordance with whether the ESD 74 is being charged or discharged. The TPIM 19 includes power inverters and respective motor control modules configured to receive the torque commands and control inverter states in response to the commands for motor A torque and motor B torque. The power inverters include known complementary three-phase power electronics devices, and each includes a plurality of insulated gate bipolar transistors for converting DC power from the ESD 74 to AC power for powering respective ones of the first and second electric machines 56 and 72, by switching at high frequencies.

Figure 2:
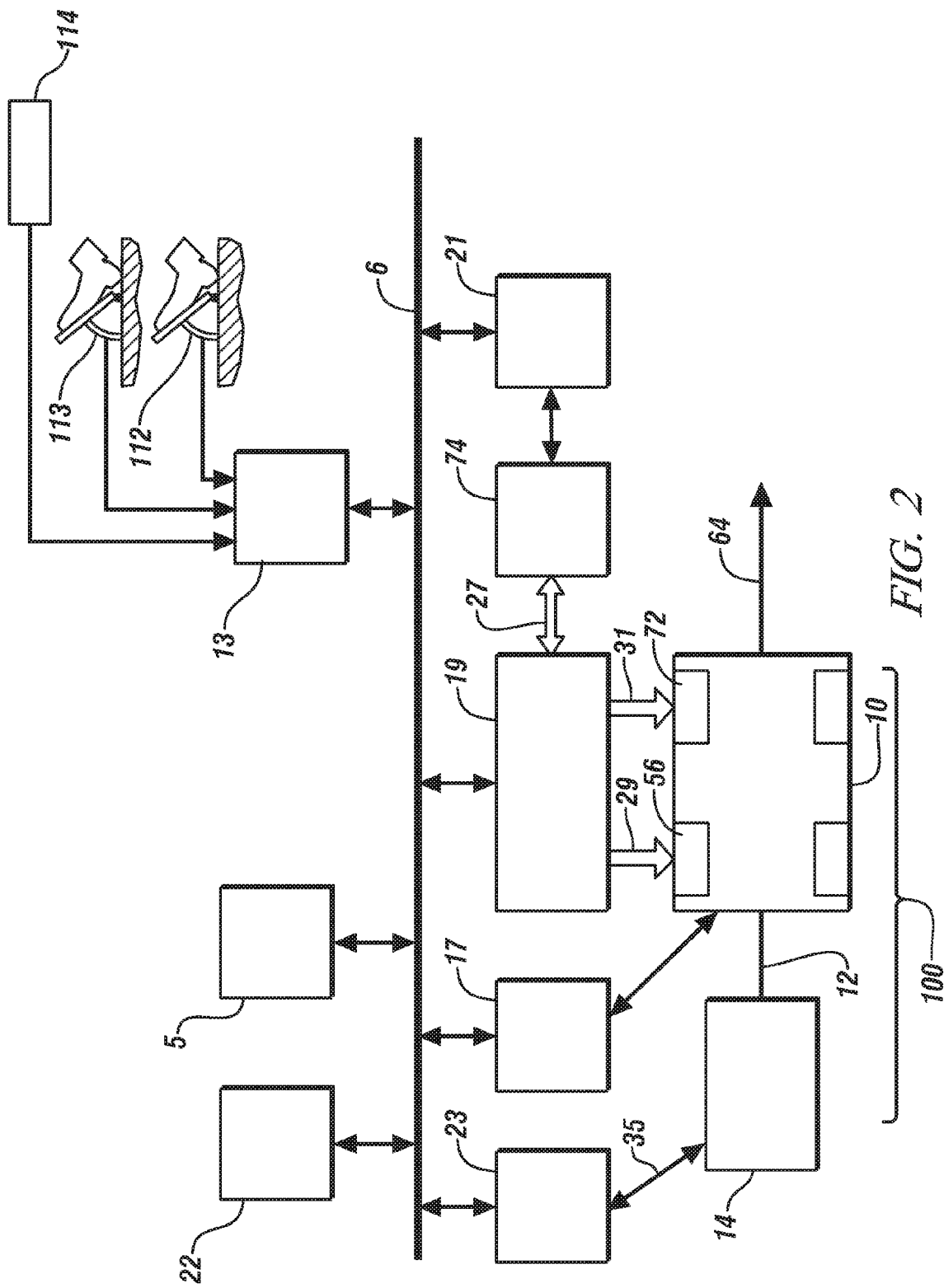
FIG. 2 illustrates a distributed controller system configured to control the hybrid powertrain of FIG. 1 in accordance with the disclosure.

FIG. 2 schematically shows an embodiment of a distributed controller system configured to control the hybrid powertrain 100 of FIG. 1. The elements described hereinafter include a subset of an overall vehicle control architecture, and provide coordinated system control of the hybrid powertrain 100 described in FIG. 1. The distributed control module system synthesizes pertinent information and inputs, and executes routines to control various actuators to meet control objectives, including objectives related to fuel economy, emissions, performance, drivability, and protection of hardware, including batteries of ESD 74 and the first and second electric machines 56 and 72. The distributed control module system includes an engine control module (ECM) 23, the TCM 17, a battery pack control module (BPCM) 21, and the TPIM 19. A hybrid control module (HCP) 5 provides supervisory control and coordination of the ECM 23, the TCM 17, the BPCM 21, and the TPIM 19. A user interface (UI) 13 is operatively connected to a plurality of operator input devices through which a vehicle operator generates an output torque request for controlling and directing operation of the hybrid powertrain 100. The operator input devices may include an accelerator pedal 113, an operator brake pedal 112, a transmission gear selector 114, e.g., a PRNDL selector, a vehicle speed cruise control, or other suitable devices for determining the output torque request. The transmission gear selector 114 may have a discrete number of operator-selectable positions, including the rotational direction of the output member 64 to enable one of a forward and a reverse direction of vehicle movement.

The aforementioned control modules communicate with other control modules, sensors, and actuators via a local area network (LAN) bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules may also be effected using a direct link, e.g., a serial peripheral interface (SPI) bus.

The HCP 5 provides supervisory control of the hybrid powertrain 100, serving to coordinate operation of the ECM 23, TCM 17, TPIM 19, and BPCM 21. Based upon various input signals from the user interface 13 and the hybrid powertrain 100, including the ESD 74, the HCP 5 determines an output torque request, an output torque command, an engine input torque command, clutch torque(s) for the applied torque-transfer clutches C1 70, C2 62, C3 73, C4 75 of the transmission 10, and motor A torque and motor B torque commands for the first and second electric machines 56 and 72.

The ECM 23 connects to the engine 14 to acquire data from sensors and control actuators of the engine 14 over a plurality of discrete lines. The ECM 23 receives the engine input torque command from the HCP 5. The ECM 23 determines the actual engine input torque provided to the transmission 10 at that point in time based upon monitored engine speed and load, which is communicated to the HCP 5. The ECM 23 monitors input from the rotational speed sensor 11 to determine the engine input speed to the input member 12, which translates to the transmission input speed. The ECM 23 monitors inputs from sensors to determine states of other engine operating parameters including, e.g., a manifold pressure, engine coolant temperature, ambient air temperature, and ambient pressure. The engine load may be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 operatively connects to the transmission 10 and monitors inputs from sensors to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed of the output member 64. Other actuators and sensors may be used to provide additional information from the TCM 17 to the HCP 5 for control purposes. The TCM 17 monitors inputs from pressure switches and selectively actuates pressure control solenoids and shift solenoids of the hydraulic circuit 42 to selectively actuate the various clutches C1 70, C2 62, C3 73, and C4 75 to achieve various transmission operating range states, as described hereinbelow.

The BPCM 21 signally connects to sensors to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power.

A brake control module (BrCM) 22 operatively connects to the friction brakes 95 on each of the vehicle wheels 93. The BrCM 22 monitors the operator input to the brake pedal 112 and generates control signals to control the friction brakes 95 and sends a control signal to the HCP 5 to operate the first and second electric machines 56 and 72 based thereon, such as for energy capture by regenerative braking operation. This includes commanding a blended brake torque, which is a combination of the friction braking torque generated at the wheels 93 and the output torque generated at the output member 64 which reacts with the driveline 90 to decelerate the vehicle in response to the operator input to the brake pedal 112.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The hybrid powertrain 100 selectively operates in one of several states that may be described in terms of engine states including one of an engine-on state (ON) and an engine-off state (OFF), and transmission operating range states including a plurality of fixed-gear and continuously variable operating modes, described with reference to Table 1, below.

TABLE 1

| Transmission Operating Range State | Engine State | Applied Clutches |
|---|---|---|
| EVT Mode 1 | ON or OFF | C1 70 |
| G1 | ON | C1 70 C4 75 |
| G2 | ON | C1 70 C2 62 |
| EVT Mode 2 | ON or OFF | C2 62 |
| G3 | ON | C2 62 C4 75 |
| G4 | ON | C2 62 C3 73 |
| Neutral | ON or OFF | None |

Table 1 indicates which of the clutches C1 70, C2 62, C3 73, and C4 75 are applied for each of the transmission operating range states for the embodiment described herein. The transmission operating range states include continuously variable modes and fixed-gear modes. The continuously variable modes include a first electrically-variable transmission (EVT) mode (EVT Mode 1) and a second EVT mode (EVT Mode 2). The fixed-gear modes include a fixed ratio operation of input-to-output speed of the transmission 10. The fixed-gear modes in first (G1), second (G2), third (G3), and fourth (G4) gears, which have progressively decreasing gear ratios to achieve correspondingly increasing output speeds in relation to input speeds. The engine states include an engine-on state (ON) and an engine-off (OFF) state. The engine is said to be operating in an unfueled state when OFF. The engine-on state includes a fuel cutoff mode (FCO) wherein the engine 14 is spinning but is operated in an unfueled state and a fueled mode wherein the engine is spinning and operated in a fueled state. For purposes of this description, the engine input speed is equal to zero revolutions per minute (RPM) when the engine state is OFF, i.e., the engine crankshaft is not spinning. In EVT Mode 1 and EVT Mode 2, the engine state may be either ON or OFF.

In response to operator inputs via the accelerator pedal 113 and brake pedal 112 as captured by the user interface 13, the HCP 5 and one or more of the other control modules determine torque commands to control the torque actuators including the engine 14 and the first and second electric machines 56 and 72 to meet the output torque request at the output member 64 that is transferred to the driveline 90. In response to input signals from the user interface 13, the HCP 5 determines the output torque request, and generates commands for operating elements of the hybrid powertrain. Commands for operating elements of the hybrid powertrain 100 include a output torque command from the transmission 10 to the driveline 90 in response to the output torque request, an input torque from the engine 14, clutch torques for the torque-transfer clutches C1 70, C2 62, C3 73, C4 75 of the transmission 10, and the motor A torque and motor B torque commands for the first and second electric machines 56 and 72, respectively. Final vehicle acceleration may be affected by other factors including, e.g., road load, road grade, and vehicle mass. The engine state and the transmission operating range state are determined based upon operating parameters of the hybrid powertrain 100. This includes the output torque request communicated through the accelerator pedal 113 and brake pedal 112 to the user interface 13 as previously described. Selection of a preferred transmission operating range state and a preferred engine state may be predicated on a torque demand caused by a command to operate the first and second electric machines 56 and 72 in an electrical energy generating mode or in a torque generating mode. Selection of the preferred transmission operating range state and the preferred engine state may be determined by an optimization routine which determines optimum system efficiency based upon operator demand for power, battery state of charge, and energy efficiencies of the engine 14 and the first and second electric machines 56 and 72. The control system controls the input torque, motor A torque, and motor B torque in response to an outcome of the executed optimization routine, and system efficiencies are optimized thereby to manage fuel economy and battery charging in response to the output torque request. Furthermore, operation may be determined based upon a fault in a component or system. The HCP 5 monitors the torque actuators and determines the power output from the transmission 10 at output member 64 that is required to achieve the output torque request while meeting other powertrain operating demands, e.g., charging the ESD 74. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3:
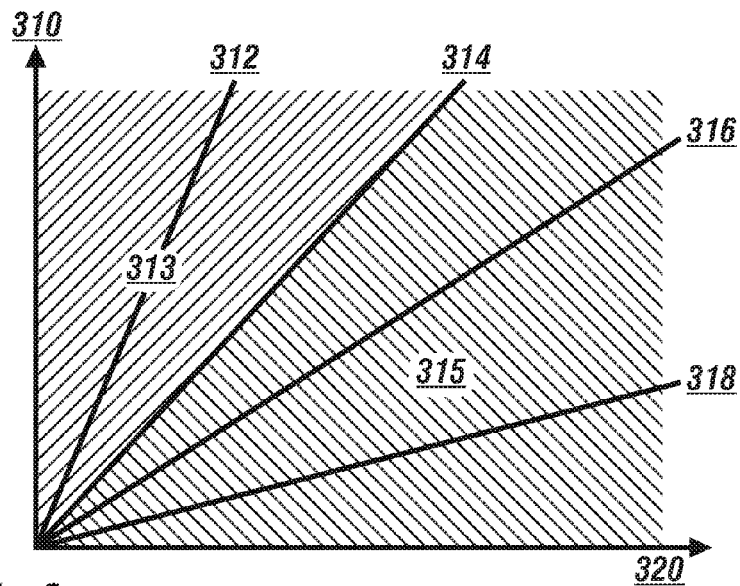
FIG. 3 illustrates transmission input speed plotted in relation to transmission output speed including data depicting transmission operating range states for the hybrid powertrain shown in FIG. 1 in accordance with the disclosure.

FIG. 3 graphically shows transmission input speed (RPM) 310 plotted in relation to transmission output speed (RPM) 320, with data including relationships between the input speed 310 and the output speed 320 for the transmission operating range states described in Table 1 for the hybrid powertrain system 100 shown in FIGS. 1 and 2. The fixed-gear operating modes of G1 312, G2 314, G3 316, and G4 318 are depicted as individual lines. The continuously variable operating modes of EVT Mode 1 313 and EVT Mode 2 315 are depicted as ranges of operation.

The electro-mechanical hybrid powertrain 100 may command a shift between a first of the continuously variable operating modes and a second of the continuously variable operating modes. Operation in EVT Mode 1 is effected by applying only clutch C1 70 and operation in EVT Mode 2 is effected by applying only clutch C2 62. A method of executing a shift between a first of the continuously variable operating modes and a second of the continuously variable operating modes includes a synchronous mode-to-mode shift, which includes an intermediate operation in one of the fixed gear operating modes, e.g., G2. A synchronous shift is characterized by application of an oncoming clutch when the speed across the clutch is substantially zero (i.e. synchronous or synchronized). Operation in the G2 fixed gear operating mode includes simultaneous application of both clutch C1 70 and clutch C2 62. As is appreciated, a synchronous mode-to-mode shift including the fixed gear G2 may require a change in the input speed that is achieved by adjusting the engine speed. Adjusting the engine speed to effect intermediate operation in fixed gear G2 may result in unacceptable noise, vibration, and harshness (NVH) including, e.g., a commanded increase in the engine speed that is noticeable and unexpected by a vehicle operator. The adjustments in the engine speed include increasing engine speed during a downshift and decreasing engine speed during an upshift. A preferred transmission operating range state is selected in response to an output torque request and the capability of the hybrid powertrain 100 to meet that output torque request.

The HCP 5 or another of the control modules may command execution of a mode-neutral-mode shift to effect a shift between a first of the continuously variable operating modes and a second of the continuously variable operating modes. The mode-neutral-mode shift is a transmission shift operation between a first of the continuously variable operating modes and a second of the continuously variable operating modes that includes an intermediate step of operating the transmission in the neutral operating range state. The mode-neutral-mode shift is executed without an intermediary step that includes operation in a fixed gear operating mode, e.g., gear G2 in the hybrid powertrain system 100 described herein. Preferably clutch deactivations and activations during the mode-neutral-mode shift are executed synchronously. Execution of a mode-neutral-mode shift is referred to as a downshift event from EVT Mode 2 to EVT Mode 1 in response to an output torque request that is either a coastdown event, i.e., an operator has provided no input to either the accelerator pedal 113 or the brake pedal 112, or a braking event wherein an operator has commanded a net braking torque through the brake pedal 112. Other operating conditions may result in a command to execute a mode-neutral-mode shift.

Figure 4:
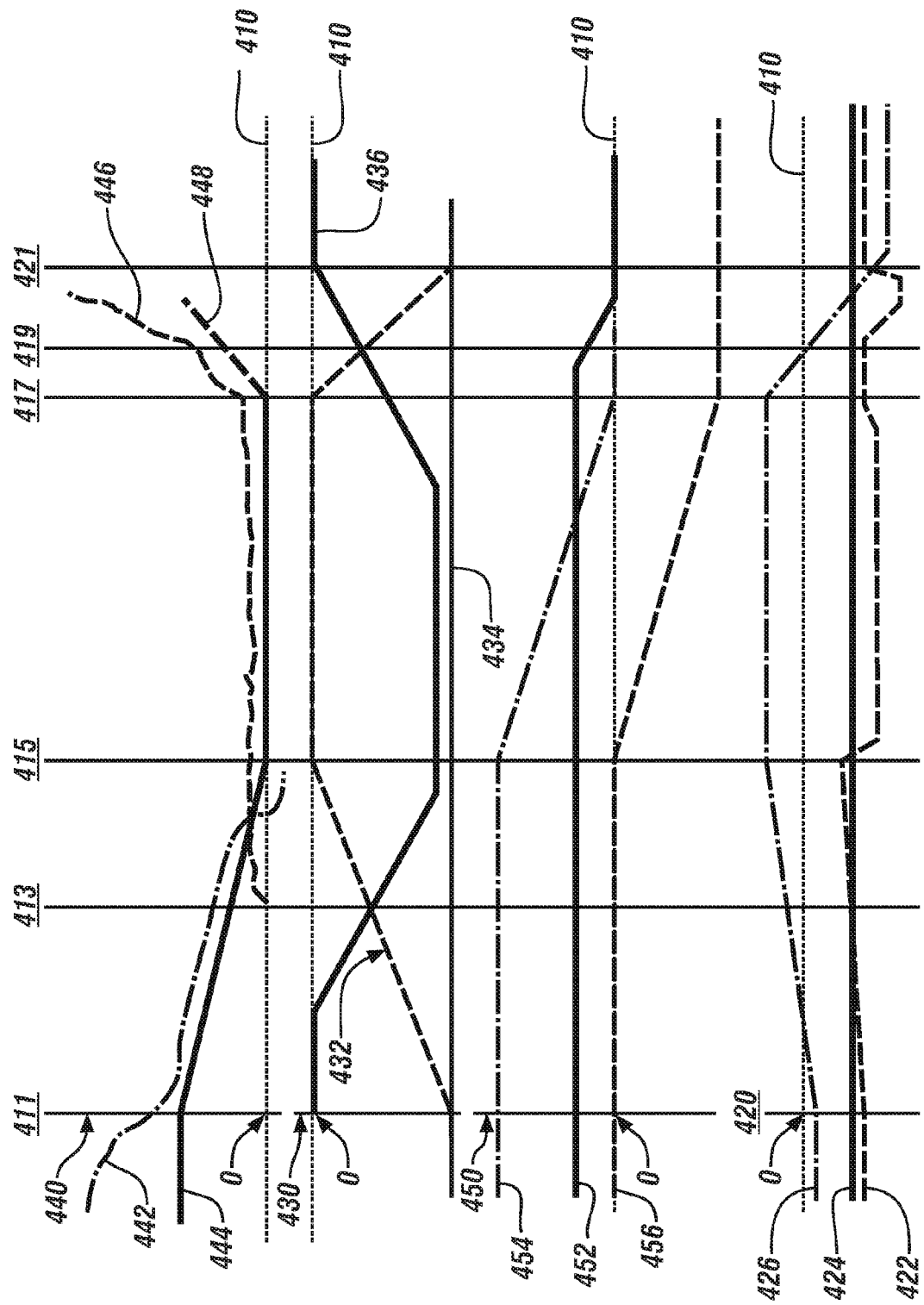
FIG. 4 illustrates time-coincident parameters related to operating the hybrid powertrain system during execution of a mode-neutral-mode shift in accordance with the disclosure.

Execution of an exemplary mode-neutral-mode shift from EVT Mode 2 to EVT Mode 1 (i.e. downshift) is illustrated in FIG. 4, which graphically shows a plurality of time-coincident parameters associated with operating the hybrid powertrain 100 described herein. The time-coincident parameters are plotted in relation to elapsed time 410 and include a torque actuator torque scale (N-m) 420, a system torque scale (N-m) 430, a clutch torque scale (N-m) 440, and a system speed scale (RPM) 450. Parameters shown on the torque actuator torque scale 420 include the input torque 424 from the engine 14, motor A torque 422 generated by the first electric machine 56, and motor B torque 426 generated by the second torque machine 72. Parameters shown on the system torque scale 430 include the output torque request 434, the achieved output torque 432, and friction braking torque 436. Parameters shown on the clutch torque scale 440 include off-going clutch pressure 442, off-going clutch torque holding capacity 444, oncoming clutch pressure 446, and oncoming clutch torque holding capacity 448. Parameters shown on the system rotational speed scale 450 include the input speed 452, off-going clutch speed 456, and oncoming clutch speed 454. As shown and described herein, clutch C2 70 is the off-going clutch and clutch C1 62 is the oncoming clutch when the hybrid powertrain 100 shifts from EVT Mode 2 to EVT Mode 1.

The hybrid powertrain 100 operates in response to a command to execute a mode-neutral-mode downshift prior to time 411, including reducing the off-going clutch pressure 442. The output torque request 434 is negative, indicating a coastdown event. The engine 14 is operating in FCO mode with the input torque 424 initially negative. Motor A torque 422 and motor B torque 426 are both negative and operating in response to the output torque request 434 and the input torque 424 to ensure the achieved output torque 432 meets the output torque request 434. As shown, the friction braking torque 436 is initially zero, indicating that there is no operator request for braking torque. It is appreciated that the friction braking torque 436 may instead be negative to indicate an operator request for braking torque.

At time 411, the off-going clutch pressure 442 has reduced to a magnitude that causes a reduction in the off-going clutch torque holding capacity 444, thus initiating a sequence of events associated with the mode-neutral-mode downshift. Subsequently, the achieved output torque 432 increases, i.e., becomes less negative, and no longer meets the output torque request 434. Reducing the off-going clutch torque holding capacity 444 results in a reduction in reactive torque that is output from the transmission 10. Motor A torque 422 and motor B torque 426 are commanded to change to reflect the change in the achieved output torque 432 and compensate for reduction in the off-going clutch torque holding capacity 444.

The control system commands an increase in the magnitude of friction braking torque 436 to compensate for a difference between the achieved output torque 432 and the output torque request 434. As appreciated, the increase in the magnitude of the friction braking torque 436 may not initially completely compensate for a difference between the achieved output torque 432 and the output torque request 434 due to system inertias and other factors.

At time 413, the oncoming clutch pressure 446 is increased in a hydraulic pre-fill of the oncoming clutch. It is appreciated that the hydraulic pre-fill action to increase the oncoming clutch pressure 446 may be executed at any appropriate time prior to synchronization and activation of the oncoming clutch.

At time 415, the off-going clutch pressure 442 has reduced to a magnitude that causes the off-going clutch torque holding capacity 444 to be zero, thus deactivating the off-going clutch. The hybrid transmission 10 is now in the neutral operating range state. This is indicated by a change in the off-going clutch speed 456 varying from zero speed. The achieved output torque 432 is zero, and the output torque request 434 is being achieved with the friction braking torque 436.

Operations are now executed to synchronize the oncoming clutch while the hybrid transmission 10 is in the neutral operating range state. Operations of the first and second electric machines 56 and 72 are controlled to ramp the oncoming clutch speed 454 to zero speed, including controlling Motor A torque 422 and motor B torque 426 as shown. It is appreciated that ramping the oncoming clutch speed 454 to zero speed includes controlling Motor A torque 422 and motor B torque 426 to synchronize the rotational speeds of opposed clamping elements of the oncoming clutch. In the embodiment shown, the oncoming clutch speed 454 is ramped to zero speed without a corresponding change in the input speed 452, although this is not a requirement. The Motor A torque 422 and motor B torque 426 are controlled to ramp the oncoming clutch speed 454 at a predetermined rate that minimizes effect upon driveability, and may take upwards of 1000 ms to synchronize.

Prior to time 417, the magnitude of the friction braking torque 436 is reduced at a ramp rate to minimize driveline torque disturbances. At time 417 the oncoming clutch speed 454 is synchronized, and the oncoming clutch pressure 446 is increased, thus increasing the oncoming clutch torque holding capacity 448. Motor A torque 422 and motor B torque 426 are adjusted accordingly, preferably with a decrease in motor B torque 426. The achieved output torque 432 decreases, i.e., becomes more negative and converges with the output torque request 434 at time 421. This set of changes facilitates operation in EVT Mode 1, and the downshift is completed.

As shown at time 419, the system may subsequently command operation with the engine 14 in the engine-off state, which necessitates controlling Motor A torque 422 and motor B torque 426 in a manner that stops rotation of the engine 14. As shown the Motor A torque 422 changes at the same time-rate change in the motor B torque 426 while controlling the input speed 452 to stop rotation of the engine 14. Subsequently, as shown at time 421, the hybrid powertrain is operating in EVT Mode 1 with the engine in the engine-off state, and the achieved output torque 432 matches and tracks the output torque request 434.

Figure 5:
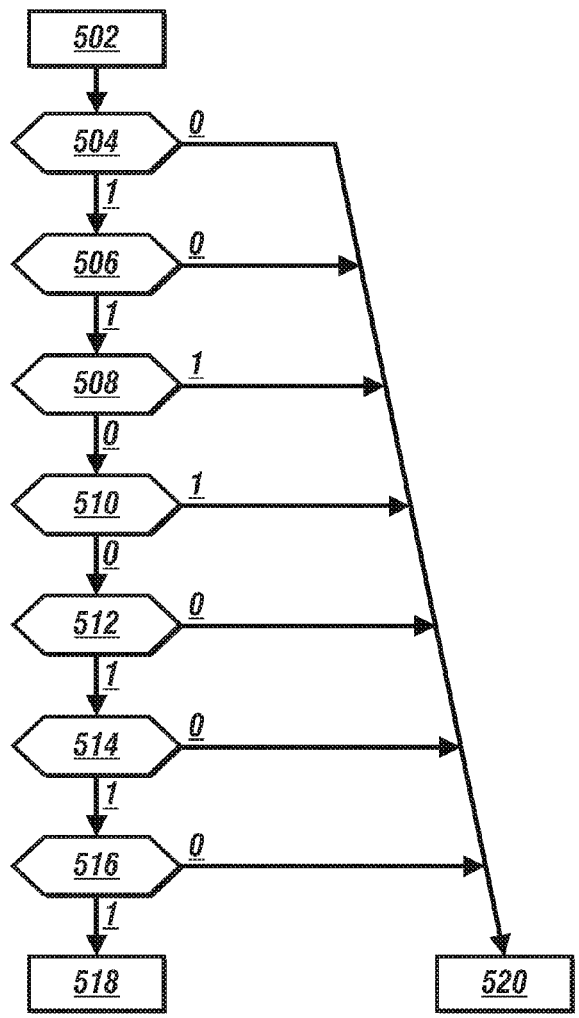
FIG. 5 illustrates a control scheme for evaluating criteria associated with deciding whether to command a mode-neutral-mode shift in accordance with the present disclosure.

FIG. 5 schematically shows a flowchart 500 for controlling operation of the hybrid powertrain 100 that includes evaluating criteria associated with deciding whether to command the mode-neutral-mode shift. Table 2 is provided as a key to FIG. 5 wherein the numerically labeled blocks and the corresponding functions are set forth as follows.

TABLE 2

| BLOCK | BLOCK CONTENTS |
|---|---|
| 502 | Monitor transmission operating range state, output torque request, engine speed, transmission operation |
| 504 | Are present and target transmission operating range states both continuously variable modes? |
| 506 | Is the output torque request within allowable range for mode-neutral-mode shift? |
| 508 | Is change in engine speed from present engine speed to engine speed required for fixed gear operation less than NVH threshold? |
| 510 | Is target engine speed for operating target continuously variable mode near target engine speed required for synchronous shift? |
| 512 | Is transmission oil temperature greater than threshold? |
| 514 | Is commanded powertrain output torque greater than allowable limit? |
| 516 | Is actual torque less than allowable limit? |
| 518 | Execute mode-neutral-mode shift |
| 520 | Execute synchronous mode-to-mode shift |

The flowchart 500 is executed as one or more routines in one of the control modules of the hybrid powertrain 100. Operation of the hybrid powertrain 100 including the transmission 10 is regularly and ongoingly monitored, including the transmission operating range state, the output torque request, engine input speed, output speed of the transmission, transmission oil temperature, and other parameters (502).

It is initially determined whether execution of mode-neutral-mode shift is a preferred shift execution strategy, e.g., whether the present and target transmission operating range states are both continuously variable modes (504). This includes determining whether the present transmission operating range state is one of the continuously variable modes (1). It is appreciated that if one or both the present and target transmission operating range states is a fixed gear state (0), execution of the mode-neutral-mode shift is not permitted and a synchronous mode-to-mode shift is executed (520).

It is determined whether the output torque request is within allowable range for execution of the mode-neutral-mode shift (506). The allowable range for the output torque request includes an output torque request that is associated with an operator having minimal or no input to the accelerator pedal 113 in one embodiment, which includes coastdown and braking events. Such coastdown and braking events may collectively be referred to as power-off events. In one embodiment, when the operator engages the accelerator pedal 113 requesting output torque, the output torque request is outside the allowable range for execution of the mode-neutral-mode shift (0) and execution of the mode-neutral-mode shift is not permitted and a synchronous mode-to-mode shift is executed (520). Other suitable output torque request states for permitting or forbidding execution of the mode-neutral-mode shift may be selected.

It is determined whether a change in engine speed from the present engine speed to a target engine speed that would be required to effect a fixed gear operation associated with the synchronous mode-to-mode shift, e.g., gear G2, is less than an NVH threshold (508). The NVH threshold is a maximum threshold for change in the engine speed that is unexpected in a coastdown or braking event and is discernible to the vehicle operator. In one embodiment, a maximum suitable NVH threshold may be a change in the engine speed in the range of 700 RPM. As such, if the change in engine speed associated with a synchronous mode-to-mode shift is greater than the NVH threshold (1), execution of the mode-neutral-mode shift is not permitted and a synchronous mode-to-mode shift is executed (520). Otherwise, if the change in engine speed is less than the NVH threshold (0), operation continues if the change in engine speed is less than the NVH threshold.

It is determined whether the target engine speed for operating in the target continuously variable mode operation is near an engine speed required for executing a synchronous mode-to-mode shift (510). This question infers that the engine will remain in the ON state subsequent to the shift execution. When the target engine speed for operating in the target continuously variable mode operation is substantially near the engine speed required for executing a synchronous mode-to-mode shift (1), the control system preferentially elects to execute a synchronous mode-to-mode shift and execution of the mode-neutral-mode shift is not permitted and a synchronous mode-to-mode shift is executed (520). Otherwise, operation continues when the target engine speed for operating in the target continuously variable mode operation is substantially less than the engine speed required for executing the synchronous mode-to-mode shift (0).

It is determined whether the transmission oil temperature is greater than a minimum threshold (512). When the transmission oil temperature is less than the minimum threshold (0), execution of the mode-neutral-mode shift is not permitted and a synchronous mode-to-mode shift is executed (520). This action avoids undue mechanical stress on the transmission under conditions when it has not been adequately warmed up. Otherwise, operation continues when the transmission oil temperature is greater than the minimum threshold (1).

It is determined whether the commanded powertrain output torque greater than an allowable limit (514). Execution of the mode-neutral-mode shift is not desired when a magnitude of powertrain braking is commanded because the loss of electrical charging due to loss of regenerative braking may be unacceptable under certain conditions (0), and execution of the mode-neutral-mode shift is not permitted and a synchronous mode-to-mode shift is executed (520). Otherwise, operation continues (1).

It is determined whether the present output torque is less than an allowable limit for the mode-neutral-mode shift (516). If so (0), execution of the mode-neutral-mode shift is not permitted and a synchronous mode-to-mode shift is executed (520). Otherwise (1), execution of the mode-neutral-mode shift is permitted (518).

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for operating a vehicle including a hybrid transmission having first and second torque machines, comprising:
    decreasing a clutch pressure of an off-going clutch associated with operating the hybrid transmission in a first continuously variable mode and decreasing a clutch torque holding capacity of the off-going clutch and applying a friction braking torque to a wheel of the vehicle coincident with decreasing the clutch pressure of the off-going clutch;
    operating the hybrid transmission in a neutral operating mode and synchronizing an oncoming clutch associated with operating the hybrid transmission in a second continuously variable mode; and
    applying the oncoming clutch and coincidentally releasing the applied friction braking torque when the oncoming clutch is synchronized.

2. The method of claim 1, wherein synchronizing the oncoming clutch comprises controlling torque of the first and second torque machines to synchronize the oncoming clutch.

3. The method of claim 2, wherein synchronizing the oncoming clutch comprises synchronizing the oncoming clutch at a predetermined rate.

4. The method of claim 1, wherein applying the oncoming clutch when the oncoming clutch is synchronized comprises increasing a clutch pressure of the oncoming clutch and increasing a clutch torque holding capacity of the oncoming clutch.

5. The method of claim 4, further comprising pre-filling the oncoming clutch prior to applying the oncoming clutch.

6. Method for operating a vehicle including a powertrain including an engine, first and second torque machines, and a hybrid transmission, comprising:
    operating the engine in an unfueled state;
    releasing an off-going clutch which when engaged effects operation of the hybrid transmission in a first continuously variable mode;
    applying a friction braking torque to a wheel of the vehicle to compensate for an increase in an output torque of the hybrid transmission resulting from releasing the off-going clutch;
    subsequent to releasing the off-going clutch, releasing the applied friction braking torque and synchronizing an oncoming clutch which when engaged effects operation of the hybrid transmission in a second continuously variable mode; and
    subsequent to synchronization of the oncoming clutch, engaging the oncoming clutch.

7. The method of claim 6, wherein operating the engine in the unfueled state comprises operating the engine in an off state.

8. The method of claim 6, wherein operating the engine in the unfueled state comprises operating the engine in a fuel cut-off mode.

9. The method of claim 6, wherein synchronizing the oncoming clutch comprises controlling torque of the first and second torque machines to synchronize the oncoming clutch.

10. The method of claim 9, wherein synchronizing the oncoming clutch comprises synchronizing the oncoming clutch at a predetermined rate.

11. Hybrid vehicle system, comprising:
    an internal combustion engine;
    at least one electric machine;
    a transmission operatively coupled to said internal combustion engine and said at least one electric machine, said transmission including a first clutch which when engaged effects operation of the transmission in a first continuously variable mode and a second clutch which when engaged effects operation of the transmission in a second continuously variable mode;
    a friction brake operative on a wheel operatively coupled to the transmission;
    a control module effecting a shift of the transmission from the first continuously variable mode to the second continuously variable mode, comprising
        operating the engine in an unfueled state;
        releasing the first clutch;
        applying the friction brake to compensate for an increase in an output torque of the transmission resulting from releasing the first clutch;

subsequent to releasing the first clutch, synchronizing the second clutch; and subsequent to synchronization of the second clutch, releasing the applied friction brake and engaging the second clutch.

\* \* \* \* \*